Figure 1:
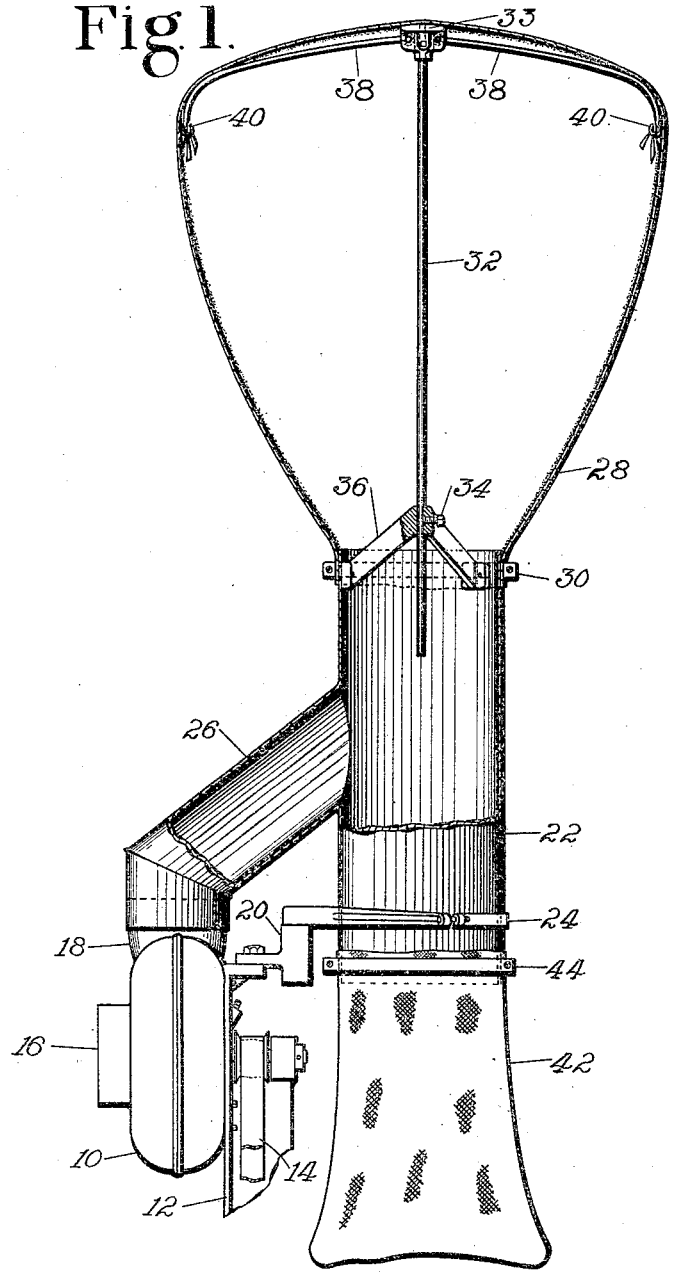

Nov. 8, 1932.    J. L. JONES    1,886,884
DUST SEPARATOR
Filed Jan. 24, 1930    2 Sheets-Sheet 2

INVENTOR
John L. Jones

Patented Nov. 8, 1932

1,886,884

UNITED STATES PATENT OFFICE

JOHN L. JONES, OF WEYMOUTH, MASSACHUSETTS, ASSIGNOR TO UNITED SHOE MACHINERY CORPORATION, OF PATERSON, NEW JERSEY, A CORPORATION OF NEW JERSEY

DUST SEPARATOR

Application filed January 24, 1930. Serial No. 423,174.

This invention relates to dust separators and is herein illustrated as embodied in a dust separator suitable for use in a dust-collecting system.

In certain industries which utilize dust-collecting systems, as for example in shoe repairing, it is ordinarily impracticable to conduct dust-laden air from the dust-collecting system through a long line of piping to some point outside of the building for delivery there into a dust separator or for direct discharge into the atmosphere. In such industries, therefore, resort is had to an indoor separator which may be positioned in the vicinity of the source of dust. Dust collectors which have hitherto been thus employed are of a type similar to that of the ordinary outdoor separator wherein the dust-laden air is forced at high velocity in a circular path and the dust is whirled out by centrifugal force, such separators being commonly referred to as of the "cyclone" type. Because of the necessarily high velocity of the stream of dust-laden air and the circuitous path which the stream must traverse in dust separators of the cyclone type, a considerable degree of back pressure is developed in these separators, and about half of the power of the blower is expended merely for the purpose of forcing the exhaust from the dust-collecting system through the dust separator. Dust separators of the cyclone type, furthermore, occupy a disproportionally large amount of floor space and are relatively expensive.

An object of the present invention is to provide a dust separator which will be free from the above-mentioned disadvantages. To this end, in accordance with a feature of the invention, the illustrated dust separator is provided with a screening element in the form of an inverted collapsible bag which closes the upper end of a substantially upright conduit having an opening in its wall, into which opening is delivered dust-laden air from another conduit. The illustrated bag is distended by the pressure of the dust-laden air within it, and when the current of dust-laden air is shut off, the collapse of the bag serves to shake off any dust which may adhere to its interior. In order to support the bag in inverted position when collapsed so that any loose dust may fall out, the illustrated construction has a disk positioned within the bag above the upper end of the upright conduit. As illustrated, also, the dust which falls out of the bag is received by a means positioned below the level of the opening in the wall of the upright conduit. Such dust as has thus been already collected is therefore retained out of the path of the incoming dust-laden air, and any danger of the separated dust being scattered by and entrained in the stream of incoming air so as to require further screening is avoided. Furthermore, in the illustrated dust separator the conduit which leads into the upright conduit is inclined upwardly, avoiding any abrupt change in the direction of the stream of dust-laden air and also directing the incoming stream upwardly and away from the dust which has already been received by the retaining means.

A plurality of pivotally supported members having their free ends secured to the inverted bag likewise may be provided, as in the illustrated separator, for guiding the bag, upon collapsing, to reduce the extent of folding which the bag might undergo and thereby to reduce the amount of dust which might be entrapped in the folds of the bag and also to prevent the bag from twisting about the above-mentioned support. An advantage of employing a bag as a screen resides in the fact that the bag, while occupying a relatively small volume of space, presents a relatively large screening area and, therefore, develops a relatively low back pressure. Therefore, only a very small amount of power of the blower which operates the dust-collecting system is expended in operating against the low back pressure, the remaining power of the blower being available to increase the intensity of the draft at the dust hoods or other points where a strong suction is desirable.

Figure 2:
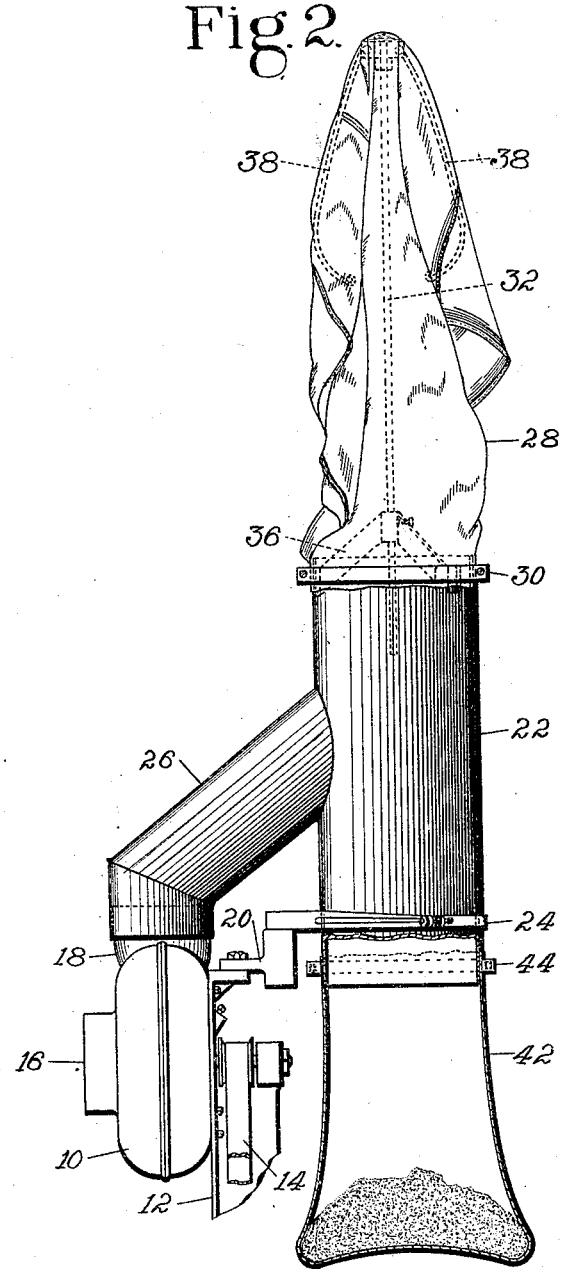

The invention further consists in various features of construction and combinations of parts herein shown and claimed, the advantages of which will be apparent to those skilled in the art from the following description, reference being had to the accompanying drawings, in which Fig. 1 is an elevational view of a dust collector embodying the invention in use; and Fig. 2 is an elevational view of the dust collector shown in Fig. 1 in the position which it assumes when not in use.

A blower 10 of the ordinary type employed in suction dust-collecting systems is mounted upon a support 12 which may be a part of a machine, such for example as a shoe-repair outfit which is provided with a dust-collecting system. The blower 10 is driven from any convenient source of power by a belt 14 and is provided with an intake 16 through which it receives dust-laden air from the dust-collecting system and with an outlet 18. A dust separator for removing dust from the dust-laden air is supported by a bracket 20 which is secured to the supporting member 12. The dust separator comprises a conduit 22 in the form of an upright open-ended drum which is held in a clamping ring 24 secured to the bracket 20. A conduit 26 connects the outlet 18 of the blower 10 to the interior of the drum 22, inclining upwardly from the outlet 18 to approximately the middle portion of the drum 22. An inverted bag 28, which may be of fireproofed Canton flannel with the nap on the inside, has its open end or mouth portion clamped around the upper end of the drum 22 by means of a clamping ring 30. The bag 28 thus constitutes a screen which closes the upper end of the conduit 22. A rod 32 which is secured by a set screw 34 in a spider 36 extends upwardly within the bag 28, the spider 36 being secured within the upper end portion of the drum 22. The rod 32 is surmounted by a disk 33 carried upon a sleeve which is secured to the upper end portion of the rod 32. A pair of arms 38 are pivotally connected, at a locality just below the disk 33, to the sleeve which carries the disk 33, the pivotal connection being such as to allow the arms 38 to swing in a vertical plane. The walls of the bag 28 are secured to the outer or free ends 40 of the arms 38. A bag 42 has its open end clamped about the lower end of the drum 22 by means of a two-part clamping member 44. The material of the bag 42 may be composed partly of asbestos, rendering the bag 42 substantially fireproof, to reduce the fire hazard which might result from an accidental ignition of dust within it.

In operation, assuming the blower 10 to be running, the stream of dust-laden air passes through the conduit 26 into the drum 22. Because of the upward inclination of the conduit 26 most of this air naturally passes from the drum 22 into the upper bag 28 without an abrupt change of direction and hence without incurring the power loss in the operation of the blower 10 which an abrupt change in direction would entail. Most of the air passes through the meshes of the fabric of which the bag 28 is composed and the dust either falls down through the upright conduit 22 into the bag 42 or else collects upon the interior walls of the bag 28. The pressure of air in the bag 28 serves to maintain the bag distended with the arms 38 outstanding, as shown in Fig. 1. When, however, the blower 10 is stopped, the failure of pressure within the bag 28 permits the bag 28 to collapse under the action of gravity, thereby shaking loose any dust which may adhere to the walls of the bag 28. The rod 32 serves to hold the collapsed bag 28 in inverted position with the body portion of the bag above the mouth portion to permit the dust released from the walls of the bag, upon collapsing, to fall out through the mouth of the bag. The arms 38 prevent the bag 28 from twisting about the rod 32 in collapsing, and serve otherwise to reduce the extent of folding which the bag might undergo, thereby reducing to a quantity which is negligible the amount of dust which might become entrapped in the folds of the bag.

The arms, furthermore, by reason of their weight and their inertia, serve to shake the bag and thereby loosen any dust which may tend to cling to it. The disk 33 affords a bearing surface for the weight of the bag when collapsed, thereby distributing, over an area considerably greater than the area of the end of the rod 32, the pressure resulting from the weight of the bag and avoiding excessive wear of the bag and danger of the rod 32 eventually punching through the fabric of the bag. The disk 33 also protects the bag from wear by contact with the hinges at the inner ends of the arms 38, and it prevents the upper portion of the bag, when collapsing, from coming together and entrapping dust.

The lower bag 42 serves as a conveniently removable receptacle for the dust which is shaken from the upper bag 28 and which falls down through the conduit 22. It also functions as a screen to permit the escape of some of the air from the conduit 22, thereby lowering the back pressure within the conduit 22. Because the lower bag 42 is positioned below the level of the point where the air stream from the conduit 26 enters the conduit 22 and because all of the air stream from the conduit 26 is upwardly directed, the dust collected in the bag 42 is entirely out of the air stream and after once settling cannot again be blown up into the bag 28 to clog the meshes of the latter.

Having described the invention, what I claim as new and desire to secure by Letters Patent of the United States is:—

1. A dust separator comprising an upright conduit having an opening in its wall, a conduit for receiving a stream of dust-laden air and adapted to deliver the dust-laden air into said upright conduit through said opening, a screen in the form of an inverted collapsible bag closing the upper end of said upright conduit for separating dust from the dust-laden air, a disk positioned above the upper end of said upright conduit within the bag for supporting the bag when the bag collapses, means for supporting said disk, and means positioned below the level of said opening in the wall of said upright conduit for retaining the dust which drops from said screen through said upright conduit.

2. A dust separator comprising an upright conduit having an opening in its wall, an inclined conduit for receiving at its lower end a stream of dust-laden air and adapted at its upper end to deliver the dust-laden air upwardly into said upright conduit through said opening, an inverted collapsible bag detachably secured to the upper end of said upright conduit and having its opening positioned to receive the dust-laden air from the upper end of said upright conduit for screening dust from the dust-laden air, and a bag detachably secured to the lower end of said upright conduit for retaining the dust which falls from the interior of the first-mentioned bag through said upright conduit when the first-mentioned bag collapses.

3. A dust separator comprising an inverted collapsible bag for receiving dust-laden air and for screening the dust therefrom, a support for the mouth portion of said bag, a support for holding the bag when collapsed in inverted position with the body portion of the bag above the mouth portion to permit the dust released from the walls of the bag upon collapsing to fall out through the mouth of the bag, and a plurality of pivotally supported members having their movable ends secured to said bag for guiding said bag upon collapsing to reduce the extent of folding which the bag might undergo and thereby to reduce the amount of dust which might be entrapped in the folds of the bag.

4. A dust separator comprising an inverted collapsible bag for receiving dust-laden air and for screening the dust therefrom, a support for the mouth portion of said bag, a rod mounted on said support extending upwardly within said bag for holding the bag when collapsed in inverted position with the body portion of the bag above the mouth portion to permit dust released from the walls of the bag upon collapsing to fall out through the mouth of the bag, and a plurality of arms pivotally mounted upon the upper portion of said rod for vertical movement, the free ends of said arms being secured to the body portion of said bag to prevent said bag upon collapsing from twisting about said rod and thereby to prevent dust from being entrapped in folds which might result from such twisting.

5. A dust separator comprising an upright conduit, means for receiving and for introducing into said upright conduit a stream of dust-laden air, an inverted collapsible bag closing the upper end of said upright conduit for separating dust from the dust-laden air, a disk positioned above the upper end of the conduit within the bag for supporting the bag when the bag collapses, a support for said disk positioned within the bag and secured to the upper portion of the conduit, and means for receiving dust which falls from the bag when the bag collapses.

In testimony whereof I have signed my name to this specification.

JOHN L. JONES.